(12) United States Patent
Henson et al.

(10) Patent No.: US 6,378,051 B1
(45) Date of Patent: Apr. 23, 2002

(54) INTERRUPT SIGNAL PRIORITIZED SHARED BUFFER MEMORY ACCESS SYSTEM AND METHOD

(75) Inventors: James A. Henson, Morgan Hill; Minnie T. Uppuluri; Gregory R. Kahlert, both of San Jose, all of CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/332,543

(22) Filed: Jun. 14, 1999

(51) Int. Cl.[7] .......................... G06F 12/06; G06F 13/24
(52) U.S. Cl. ..................... 711/151; 711/158; 710/48; 710/240; 710/264
(58) Field of Search ............................ 711/112, 150, 711/154, 4, 151, 158; 710/58, 5, 240, 39, 40, 44, 48, 264, 129; 369/44.34

(56) References Cited

U.S. PATENT DOCUMENTS

| | | | |
|---|---|---|---|
| 5,465,343 A | | 11/1995 | Henson et al. ............... 395/439 |
| 5,598,575 A | * | 1/1997 | Dent et al. ..................... 710/28 |
| 5,634,015 A | * | 5/1997 | Chang et al. ................ 710/129 |
| 5,699,330 A | * | 12/1997 | Ogino et al. ................... 369/32 |
| 5,983,301 A | * | 11/1999 | Baker et al. ................. 710/113 |
| 6,067,139 A | * | 5/2000 | Bohm et al. ................. 349/123 |
| 6,098,114 A | * | 8/2000 | McDonald et al. ............. 710/5 |
| 6,188,699 B1 | * | 2/2001 | Lang et al. .................. 370/463 |
| 6,266,306 B1 | * | 7/2001 | Schell et al. ............. 369/44.34 |

* cited by examiner

*Primary Examiner*—Matthew Kim
*Assistant Examiner*—Pierre-Michael Bataille
(74) *Attorney, Agent, or Firm*—David M. Sigmond

(57) ABSTRACT

A single microprocessor (22) hard disk drive (10) having a shared buffer memory (40) for storing sector data as well as microprocessor variables and code includes a buffer manager (38) for arbitrating requests from various channels or clients for access to the shared buffer memory. The buffer manager arranges channels including a disk data channel (32, 140), a host interface channel (50, 140), and microprocessor channels (144, 148) into a round-robin circular priority queue, with the disk data channel normally assigned the highest priority for buffer access. A state machine carries out an arbitration cycle by sequentially servicing access requests pending within the queue. The state machine senses (139) a servo interrupt (SVOINT) to elevate the priority of any pending microprocessor access requests to the shared buffer, such that the requests are serviced and cleared rapidly to allow the servo interrupt servicing routine to start sooner. The servo interrupt is preferably asserted during a spoke gate (100) time when a head (16) is sensing a disk (12) servo region (S). During this time data transfers between the disk and the shared buffer memory are stopped, pending buffer memory data transfers can be paused, and head seeking and tracking is controlled. This technique reduces the uncertainty delay in starting the servo interrupt service routine by 10 percent, which restores otherwise lost processing time and reduces head positioner servo (20) phase jitter, thereby improving head tracking and seeking performance.

24 Claims, 5 Drawing Sheets

INTERRUPT SIGNAL PRIORITIZED SHARED BUFFER MEMORY ACCESS SYSTEM AND METHOD

RELATED APPLICATION(S)

Not applicable

FEDERALLY SPONSORED RESEARCH OR DEVELOPMENT

Not Applicable

TECHNICAL FIELD

This invention relates to buffer memory access management within a disk drive data storage device and more particularly to a head servo interrupt system for improving microprocessor channel priority during memory access arbitration in a single processor, shared memory disk drive embedded controller environment.

BACKGROUND OF THE INVENTION

Prior disk drives have included, in addition to a disk data channel and a host data channel, at least one embedded digital microprocessor for controlling various functions of the disk drive such as head positioning, spindle motor speed regulation, read channel adjustments for zoned data recording and error correction tasks, and the supervision of data block transfers between disk and host in response to host commands received via the host channel. Such disk drives have typically included a large data cache memory for temporary storage of multiple data blocks in transit between the disk data storage surface and the host computing system, and smaller first-in-first-out ("FIFO") buffers associated with the disk data channel and the host data channel.

More recently, use of on-board shared buffer memory has been employed to provide storage of instructions and data needed for microprocessor operations, with microprocessor accesses to buffer memory being multiplexed between disk channel and host channel block transfer memory accesses. These relatively large shared memory arrays have typically employed dynamic random access memory chips (DRAM).

The DRAM memory in disk drive systems must be shared among several processes, often referred to as "clients." This sharing arrangement presents an interesting challenge to the disk drive designer. On the one hand, a DRAM operates most efficiently if the same client presents a continuous series of sequential access requests to the DRAM in page mode. Depending upon DRAM type, page mode accesses are from three to nine times faster than non-page mode access requests. However, each client typically needs to obtain DRAM access as often as possible, which reduces the time a particular access can be handled in page mode.

In some prior disk drives, the various process and resource clients have accessed DRAM by employing multiplexing and access arbitration. For example, if only one client, such as the disk data channel, has frequent, high-bandwidth, "absolutely must have" need for DRAM access, a simple priority technique suffices. The disk data channel typically has this requirement, and because the length of the disk FIFO is limited, data will be lost if the disk data channel FIFO is overrun. Other high-bandwidth channels, such as the host interface (SCSI or ATA), can be throttled when its FIFO is full. Therefore, it is desirable to give the disk channel the highest priority when its FIFO is nearly full, and hold the priority high until the FIFO is empty.

On the other hand, the host channel may have access gaps. Therefore it has a lower priority, but when it obtains access to the DRAM, it maintains its access until its FIFO is emptied, or until the disk channel overrides. The microprocessor, memory refresh, and other clients may be assigned a medium priority.

One example of such a technique is described in U.S. Pat. No. 5,465,343 for SHARED MEMORY ARRAY FOR DATA BLOCK AND CONTROL PROGRAM STORAGE IN DISK DRIVE, which is assigned to the assignee of this application, and is incorporated herein by reference. In this approach, buffer memory access arbitration follows a hierarchical approach with each internal client seeking buffer access at a predefined priority. For example, the disk data channel has the highest priority because data transfers to and from the disk must be made in synchronism with storage disk rotation to avoid delays caused by multiple disk rotation latencies during a data transfer. DRAM memory refresh is accorded a next priority level, and host interface or control microprocessor clients are accorded yet a lower priority level.

Round-robin access techniques are described in which when all channels are requesting DRAM access, each channel is serviced in a fixed order and for a predetermined maximum time interval. If any channel is not requesting access, the next channel in the priority sequence assumes access, and so on. In any of these access techniques, the DRAM is never idle if an unserviced access request exists from any channel.

A problem with this round robin access technique is that all the predetermined time intervals must account for the worst case access times. Another problem is that some clients have dissimilar DRAM data access patterns. For example, the disk and host channels employ large sequential block accesses to the DRAM via multi-word FIFOs and are, therefore, suited for fast, page mode transfers. In contrast, the microprocessor typically fetches and decodes single instructions from the buffer, thereby potentially delaying subsequent buffer memory accesses by the microprocessor.

These problems manifest themselves as a memory access uncertainty time that ranges from practically zero to the above-described predetermined maximum time interval, which must always be accommodated. This not only reduces the DRAM access time, but also reduces the time available for the execution of high-priority head seeking and tracking routines that are critical to overall disk drive performance. Such routines typically require at least half of the total available microprocessor time, with the reduced time compromising the head servo phase margin and increasing timing jitter in the head servo loop.

It is also known in the digital computer field to provide blended priority and round-robin bus arbitration techniques. While such techniques may work well within multiprocessor and multimedia computing environments, they are not adapted to the unique problems and challenges of shared buffer management in a low-cost hard disk drive.

What is needed, therefore, are further improvements in the techniques for accessing buffer memory in an embedded disk drive controller employing a shared memory and a single microprocessor.

SUMMARY OF THE INVENTION

An object of this invention is, therefore, to provide an apparatus and a method for efficiently and effectively arbitrating among competing clients seeking access to a shared memory array within the embedded controller of a hard disk drive in a manner overcoming limitations and drawbacks of the prior art.

Another object of this invention is to employ a head servo-process interrupt signal in combination with a circular priority queuing structure to reduce the access time of clients contending for access to a single buffer memory array within a disk drive.

Yet another object of this invention is to employ a head servo-process interrupt signal in combination with a circular priority queuing structure to increase the head servo processing time available, thereby reducing uncertainty time jitter while improving disk drive phase margin, seeking, and tracking performance.

A single microprocessor hard disk drive having a shared buffer memory for storing sector data as well as microprocessor variables and code includes a buffer memory arbitrator for arbitrating requests from various channels or clients for access to the shared buffer memory. The arbitrator arranges various channels including a disk data channel, a host interface data channel, and a microprocessor channel into a round-robin circular priority queue, with the disk data channel normally assigned the highest priority for buffer access. A state machine carries out the arbitration cycle by sequentially servicing access requests pending within the queue. The state machine also senses a servo interrupt to elevate the priority of any pending microprocessor access requests to the shared buffer, such that the accesses clear rapidly, thereby allowing the servo interrupt servicing routine to process more rapidly and completely. The servo interrupt is preferably asserted during a spoke gate, or wedge, time when the data transducer head is sensing a servo region on the disk. During this time read/write data transfers between the disk and the shared buffer memory are ordinarily stopped and any pending buffer memory data transfers can be paused without causing errors. This reduces the uncertainty delay in starting the head servo interrupt service routine from prior delays of about zero to 4,500 nsec down to about zero to 1,400 nsec. The 3,100 nsec saved represents a 10 percent overhead reduction in running the routine, which restores otherwise lost processing time and reduces phase jitter in the head positioner servo, thereby improving head tracking and seeking performance.

Additional objects and advantages of this invention will be apparent from the following detailed description of a preferred embodiment thereof that proceeds with reference to the accompanying drawings.

DETAILED DESCRIPTION OF A PREFERRED EMBODIMENT

Figures 1, 2, 3:
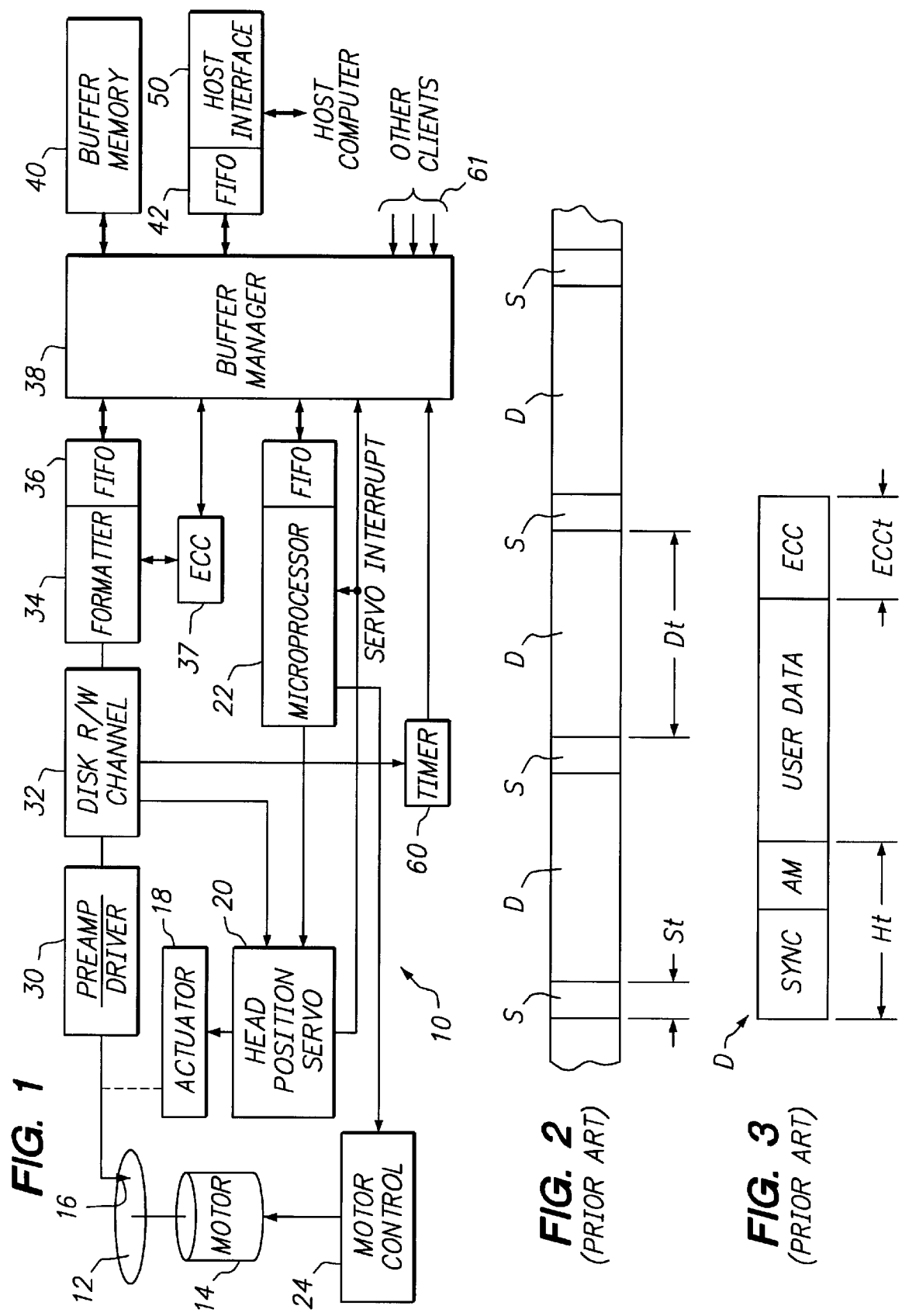
FIG. 1 is a simplified electrical block diagram of a miniature hard disk drive architecture suitable for use with this invention.
FIG. 2 is a linear view representing a portion of one concentric data track defined on a data storage surface of a rotating storage disk of FIG. 1.
FIG. 3 is an expanded view of a portion of the data track of FIG. 2 enlarged to show a single user data block.

FIG. 1 shows portions of an exemplary disk drive architecture that is pertinent to an understanding and appreciation of this invention. A disk drive 10 includes a rotating data storage disk 12 and a spindle motor 14 for rotating disk 12 at a predetermined rotational velocity. In the case of a Winchester or "flying head" disk drive, the rotational velocity must be sufficient high to sustain flying characteristics of a data transducer head 16. The present state-of-the-art rotational velocity is typically in a range between 5,000 RPM and 10,000 RPM. An electromechanical actuator structure 18 is mechanically linked to data transducer head 16 for positioning it at each selected one of multiple concentric data tracks defined on the thin film magnetic recording surface of data storage disk 12. Disk 12, spindle motor 14, transducer 16, and actuator 18 are conventionally included within an enclosed, contaminant-free housing referred to by skilled workers as a "head and disk assembly."

Actuator structure 18 is controlled by a head positioner servo 20 that is in a control loop driven by a disk drive 10 embedded control microprocessor 22. A spindle motor controller 24 provides controlled driving currents to spindle motor 14, which is preferably a polyphase DC brushless motor that operates under supervision of microprocessor 22.

Data transducer head 16 is electrically coupled to a preamplifier/head selector/write driver circuit 30 that is typically housed in the head and disk assembly to be close to head 16 and, thereby, minimize pickup of extraneous electrical noise. Driver circuit 30 is electrically connected to a disk read/write channel 32 that converts digital information into analog information, and vice versa. In this example, disk channel 32 is driven by a formatter 34 and a disk FIFO 36. An embedded error correction code (ECC) process 37 cooperates with formatter 34 to generate and append ECC remainder bytes during data writes to disk 12, and to generate ECC syndrome bytes during data reads from disk 12. When user data errors are detected, ECC process 37 locates and corrects the errors within the below-described shared buffer memory and is, therefore, a client contending for buffer memory access.

FIFO 36 is connected as a priority client to a buffer manager 38 that arbitrates among various clients for access to a buffer memory 40 that provides user data block storage, microprocessor 22 instruction and data storage, and storage for other clients within disk drive 10. Buffer memory 40 is preferably a 128 Kbyte cache buffer memory array. Buffer manager 38 is also connected through a host interface FIFO 42 to a host interface 50, such as a SCSI controller or a fast ATA controller that interconnects disk drive 10 to a host computing environment.

A servo interrupt signal ("SVOINT") is generated by head positioner servo 20 and is connected to microprocessor 22 and buffer manager 38. The generation and use of SVOINT is described in more detail with reference to FIGS. 5–7.

A timer circuit 60 generates timing control sequences for buffer manager 38 in synchronism with the rotation of disk 12. Other clients 61 within disk drive 10, typically include a defect map manager (not shown) that contends with disk channel 32, host interface 50, and microprocessor 22 for access to buffer memory 40.

Data are recorded magnetically as a pattern of magnetic flux transitions within concentric data tracks defined on a storage surface of disk 12. The flux transition patterns include encoded user data and certain overhead information needed for disk drive operation. For example, FIG. 2 shows a typical data track on disk 12 that includes a series of spaced apart data regions D alternating with embedded sector or servo regions S. Data regions D are typically encoded according to the partial response, most likely ("PRML")

code specification. There may be 100 or more servo regions S embedded within each concentric data track. Each servo region S includes information used by head position servo 20 for precisely positioning and tracking head 16 over the particular track and for enabling precision seeking from a departure track to a destination track during track seeking operations.

Each servo region S provides a "servo time" interval St during which user data does not transfer to or from disk 12. Accordingly, servo time St is available for buffer manager 38 to arbitrate additional time among other clients for access to buffer memory 40. Of course, skilled workers will understand that even when data transducer head 16 is reading user data, buffer manager 38 may allow access to other clients.

FIG. 3 further shows that within each data region D, certain overhead information is also present that is not stored in buffer memory 40. This information includes a sync field, an address mark field, and an ECC field at the end of the user data block. The user data block may be fully contained within the data space between servo region S, or it may be divided into segments that span one or more servo regions. In the latter case, each segment would include a header portion to enable resynchronization to the user data following interruption by the servo regions S. The time intervals when head 16 is passing over the header portion are referred to as "header time" Ht, and time intervals when head 16 is passing over the ECC portion are referred to as "ECC time" ECCt. Ht and ECCt are additional times during which buffer manager 38 may allocate additional access to buffer memory 40 by other clients.

In general, disk read/write channel 32 requires the highest priority access to buffer memory 40 to prevent data loss. If excess buffer access is provided to disk read/write data channel 32, no performance increase is noted at the host computer, or ultimately by a user. Therefore, host interface 50 can be throttled to reduce its access to buffer memory 40, However, host interface 50 access to buffer memory 40 is a performance parameter most visible to the user. Accordingly, the buffer allocation algorithm should maximize access to host interface 50.

Figure 4:
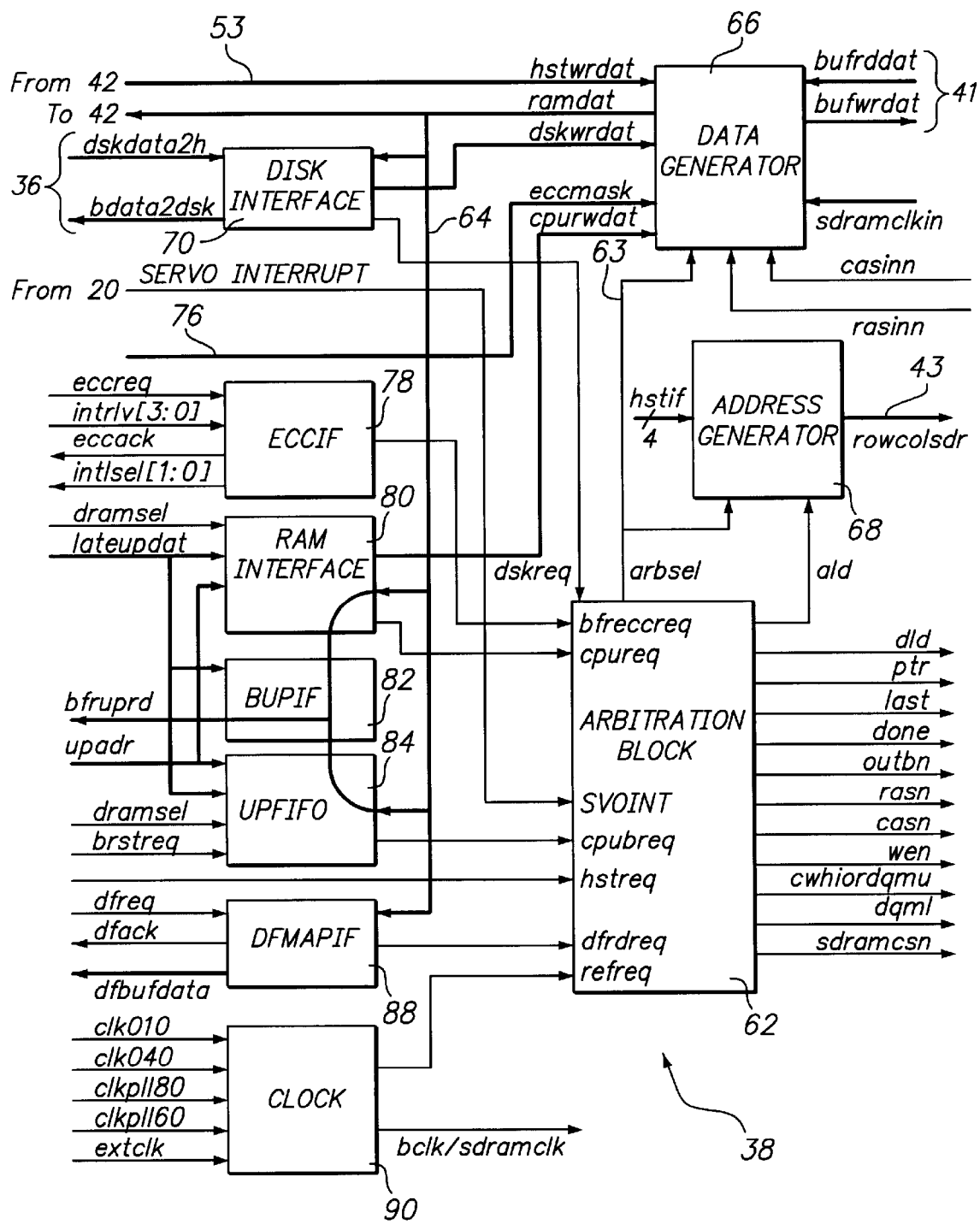
FIG. 4 is a more detailed electrical block diagram of a buffer manager block shown in FIG. 1.

Microprocessor 22 needs to minimize the time between a buffer memory access request and the associated service by buffer manager 38 because microprocessor 22 is idle while a buffer access request is pending. Accordingly, there is a maximum allowable time for servicing such a request, which the system designer attempts to minimize. If the microprocessor buffer request take longer, it follows that the servicing of servo interrupt requests by microprocessor 22 will be delayed. Accordingly, the frequency of checking microprocessor 22 for buffer memory 40 access requests by buffer manager 38 should be maximized. Other clients 61 also contend for access to buffer memory 40 and these access requests must be handled in an orderly manner by buffer manager 38 such that memory access bandwidth is maximized without compromising critical processes. Accordingly, buffer manager 38 is preferably implemented as shown in FIG. 4, in which an arbitration block 62 performs buffer access arbitration, receives various client status values and access requests, and generates a series of control signals for accessing buffer memory 40. These signals are shown as arrows extending to the right from arbitration block 62. Arbitration block 62 also generates arbitration selection control data and conveys it over a path 63 to a data generator (multiplexer) 66 and to an address generator 68. Data generator 66 receives incoming data from host interface 50 via paths 53, and from other channels including disk channel 32 via a disk interface 70, an ECC mask channel via a path 76, and a microprocessor data channel via a microprocessor RAM interface 80. Data flowing from buffer memory 40 passes through data generator 66 to a RAM data bus 64, which connects to host interface FIFO 42, disk channel FIFO 36 via disk interface 70, the ECC channel via an interface 78, microprocessor 22 via interface 80, and the defect map channel via an interface 88. Interfaces 50, 70, 78, 80, 84, and 88 generate and present buffer memory access requests shown as arrows leading into the left and top sides of arbitration block 62. A clock circuit 90 provides a reference clock to arbitration circuit 62 for implementing timer 60 of FIG. 1.

As described above with reference to FIG. 2, each servo region S provides a "servo time" interval St during which user data does not transfer to or from disk 12 and in which buffer manager 38 may arbitrate among other clients for access to buffer memory 40.

Figure 5:
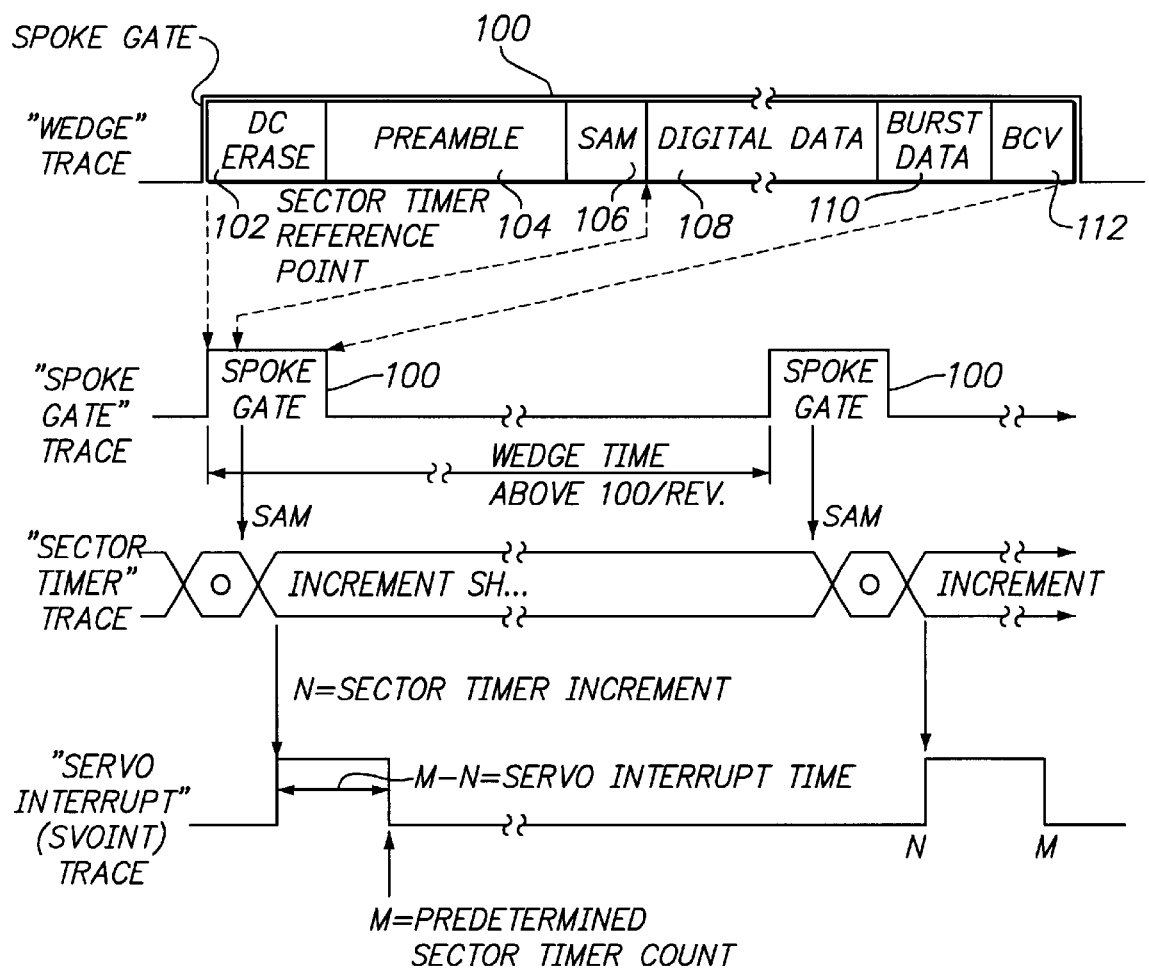
FIG. 5 is a group of electrical waveform diagrams showing the signal and timing relationships employed to generate a servo interrupt signal of this invention.

FIG. 5 further shows that within each servo region S, certain information is present as set forth below. Moreover, in disk drive 10, there are typically about 100 servo regions per track on disk 12. Therefore, a servo region S passes head 16 every 60 to 150 microseconds or so, depending upon the exact number of servo regions per track and the disk rotational velocity. To improve servo locking and tracking performance, servo region S is encoded with constant data rate information, meaning that servo region S flux transitions are packed more closely together near the center of disk 12 and spread somewhat apart near the periphery of disk 12. Servo regions S are also radially aligned from track to track on disk 12, and when taken together, form wedge-shaped spoke areas on disk 12. Accordingly, servo regions S are often referred to as "spokes" or "wedges" and servo time St is often referred to as a "wedge time" or a "spoke gate."

A spoke gate 100 has a format that typically includes six functional fields as represented in the "wedge" trace of FIG. 5. A first field is a DC erase area 102 that intentionally violates the PRML code specification to allow data transducer head 16 to detect a unique flux pattern when first acquiring servo lock. A second field is a preamble 104 for synchronizing a phase-lock loop ("PLL") to the read channel data adjusting the gain of read channel 32 appropriately. A third field is a servo address mark ("SAM") 106 that synchronizes read channel 32 and related controller functions to the disk data. A fourth field contains digital information 108 that may include any or all bits of a track number, spoke number, head number, and track number LSB data. A fifth field contains servo burst data 110 that provides fine positioning information for the servo position control algorithm. Servo burst data 110 are synchronously sampled by a fast analog-to-digital converter ("ADC") in the PRML portion of read channel 32. A sixth field contains a burst correction value ("BCV") 112 that is additional digital data used for correcting angular rotation asymmetries of the data track.

Spoke gate 100 data are typically decoded using a "wide bi-phase" data coding method. The data are synchronously read with a fast ADC sampling the incoming waveform at a predetermined phase and frequency optimized to interpret the incoming waveform. Wide bi-phase code has a data bit one symbol and a data bit zero symbol. Data bits one and zero are defined such that "+" refers to a positive polarity write current and "−" refers to a negative polarity write current. Data bit one is preferably written as a ++−− sequence, and data bit zero is preferably written as a −−++ sequence.

DC erase area 102 is used to locate the beginning of spoke gate 100. Read channel 32 employs PRML code detection to decipher SAM 106 and digital information 108, which are valid PRML symbols. However, DC erase area 102 is not a valid PRML symbol, which allows special circuitry within read channel 32 to search for and detect DC erase area 102.

Preamble 104 is a pattern used to synchronize the read channel PLL and setup the gain. The preferred preamble pattern is a wide bi-phase coded string of data one bits having a predetermined frequency and phase for synchronizing read channel 32. Synchronization to the phase is referred to as "chunk sync". The length of preamble 104 depends on the rotational speed tolerance of the motor and the time required to lock to the preamble pattern.

SAM 106 is preferably a fault tolerant 000100101 pattern written in wide bi-phase format.

Digital information 108 are coded in wide bi-phase format with an additional gray code constraint on the track number and track number LSB. Read channel 32 starts sending digital information 108 two clock cycles after detecting SAM 106. Digital information 108 contains track and spoke information for the servo control program executed by microprocessor 22.

There are two types of digital information 108. Some information is naturally radially coherent, such as the spoke number, which leads to the wedge shape. No extra coding is involved in processing this number.

The track number and track number LSB's change from track to track. To maintain some coherence from track to track, the track number is gray coded, meaning that only one bit changes from track to track.

Servo burst data 110 are synchronously sampled and a single frequency Fourier transform is performed on the sampled data. The magnitude of the Fourier transform, taken at the burst frequency, is used to generate a burst amplitude value for each spoke gate 100. The individual burst amplitudes are used to provide fractional track positioning data for head positioner servo 20.

BCV 112 is not synchronous with the other spoke data and must, therefore, be processed differently. When reading BCV 112, read channel 32 behaves as a synchronous peak detector to detect BCV data peaks. This is accomplished by synchronously sampling the disk data, passing the samples through a three tap FIR filter, and thresholding the filter output. The resulting bit stream is framed, converted to data, and decoded.

Figure 6:
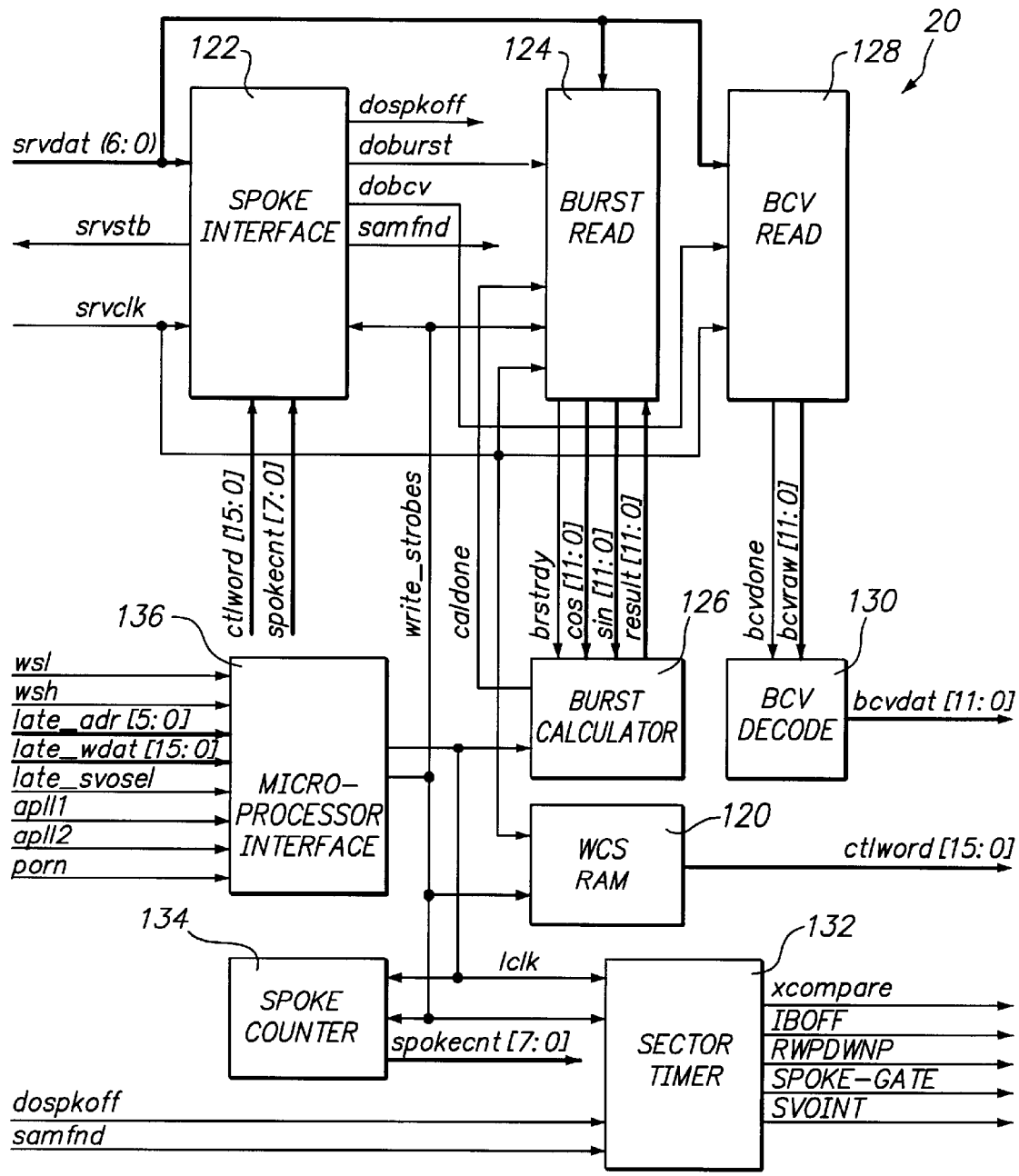
FIG. 6 is a more detailed electrical block diagram of a head position servo block shown in FIG. 1.

FIG. 6 shows a more detailed electrical block diagram of head positioner servo 20 (FIG. 1), which controls the reading and decoding of the above-described fields of each spoke gate 100 and tracks the timing between spoke gates. A writable control store ("WCS") RAM 120 controls access sequences to the spoke gate 100 fields. A spoke interface 122 reads DC erase status, preamble status, zero phase start, SAM 106, and digital information 108 from read channel 32. A burst read 124 block detects burst values that are passed to a burst calculator 126 for generating head tracking data. BCV read 128 and BCV decode 130 blocks receive and generate the BCV data. A sector timer 132 determines the time between spoke gates 100, and employs a spoke counter 134 compare against the spoke number read from disk 12 to ensure correct servo data.

In particular, sector timer 132 provides programmable control of the time duration of a servo region S and other head positioner servo 20 functions, such as the SVOINT signal, servo data write protection, and spoke timing. Sector timer 132 is preferably a 13-bit, synchronously loadable up-counter. When spoke interface 122 detects SAM 106, a SAMFND signal is sent to sector timer 132. The SAMFND signal causes the current value of sector timer 132 to be saved in a SAM-to-SAM time register and resets sector timer 132 to zero. If spoke interface 122 misses a SAM 106, sector timer 132 keeps counting upward. When sector timer 132 reaches a time value equal to the value in a Timesup-time-out register, sector timer 132 loads the Timesup-load time register value, which is a value sector timer 132 would normally hold if SAM 106 was not missed. Loading the Timesup-load time value allows WCS 120 to finish processing the current spoke gate 100 and allows sector timer 132 to search for the next SAM 106 at the expected time.

The programmable functions are accomplished by comparing sector timer 132 values to register values loaded by microprocessor 22 or WCS 120. When a value loaded in one of the registers equals the current value in sector timer 132, an output is generated. Following is a description of the programmable functions:

Servo Interrupt time—controls when the Servo interrupt is asserted.

Servo Interrupt Off time—controls when the Servo interrupt is deasserted.

End Sector time—controls when SPOKE gate 100 begins and Overlap Read data time-out begins.

Start Sector time—controls when spoke gate 100 ends and data region D begins.

Spoke counter 134 is preferably an 8-bit, synchronously loadable upcounter that is incremented at the rising edge of spoke gate 100 until its value equals the max spoke value, at which time spoke counter 134 is reset to zero. Spoke counter 134 is initially loaded when read channel 32 synchronize to the data on disk 12. Spoke interface 122 compares the spoke counter 134 value against the spoke number read by read channel 32 to ensure that data transducer head 16 is properly positioned on disk 12.

WCS 120 is preferably an asynchronous 48×16 two port RAM that enables executing microprocessor 22 DO, JUMP, and WAIT instructions in one clock cycle.

Referring again to FIG. 5, sector timer 132 generates the SVOINT shown in the "servo interrupt" trace as follows. As shown in the "wedge," "spoke gate," and "sector timer" traces, the falling edge of SAM 106 is used as a sector timer reference point that resets sector timer 132, which was counting from the last detected reference point in the prior wedge. When sector timer 132 reaches a programmable "servo interrupt time" value N, SVOINT is asserted as shown in the "servo interrupt" trace. Sector timer 132 keeps counting, and when it reaches a programmable "servo interrupt off time" value M, SVOINT is turned off.

The M–N difference represents the SVOINT interrupt duration, which is a useful parameter because buffer manager 38 only asserts this priority microprocessor access to buffer memory 40 while SVOINT is asserted. The programmability of N and M provides complete control over the duration and timing of SVOINT. N and M can be preset to values anywhere in the 13-bit range of sector timer 132, allowing SVOINT assertion during times between spoke gates 100 or while data transducer head 16 is over a spoke gate 100. Preferably SVOINT is asserted during a time interval starting when data transducer head 16 senses the end of user data regions D and ending slightly after data transducer head 16 senses the start of the next user data region D following the intervening spoke gate 100. The programmable width SVOINT enables tuning the duration of priority access to buffer memory 40 as a function of a number of access requests that are queued up by microprocessor 22 to buffer manager 38.

Figure 7:
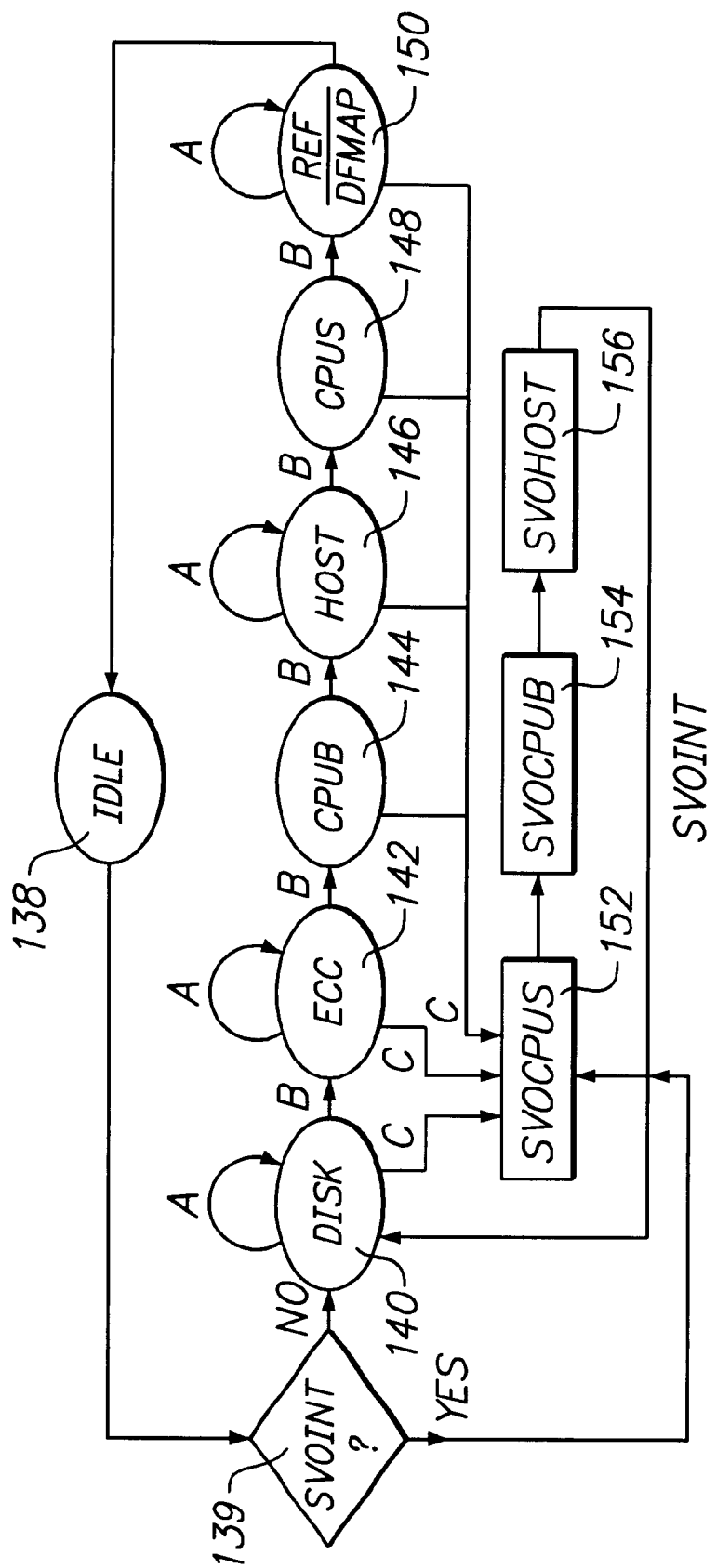
FIG. 7 is a state diagram representing operational states of a servo interrupt driven buffer memory access arbitration technique of this invention.

FIG. 7. shows a state diagram representing the operation of a buffer memory arbitration technique of this invention that is based on a round-robin, circular priority, approach in which each client sequentially gains highest priority access to buffer memory 40. The arbitration technique starts at an idle state 138. When a round robin arbitration is started, an interrupt testing state 139 determines whether SVOINT is asserted. If it is not, the arbitration technique sequentially services a disk data channel ("DISK") 140 until done as indicated by loop A, an error correction channel ("ECC") 142 until done as indicated by loop A, a microprocessor instruction fetch ("CPUB") 144, a host data channel ("HOST") 146 until done as indicated by loop A, a microprocessor data fetch ("CPUS") 148, and a buffer memory refresh and defect map fetch channel ("REF/DFMAP") 150 until done as indicated by loop A. Following completion of each service state, service is passed to the next service state along paths B. Following normal completion of all those service states, the arbitration technique returns to idle state 138 to await another arbitration cycle. The various clients requiring access to buffer memory 40 are allowed access for a respective number of accesses as set forth below in Table 1.

TABLE 1

| CLIENT REQUESTING ACCESS | NO. OF MEMORY ACCESSES |
| --- | --- |
| disk data channel 140 | up to FIFO 36 empty/full |
| error correction channel 142 | up to 16 (8 reads & 8 writes) |
| microprocessor instruction fetch 144 | up to a programmed value |
| host data channel 146 | up to a programmed time |
| microprocessor data fetch 148 | up to 2 |
| buffer memory refresh channel 150 | 1 |
| defect map fetch channel 150 | 1 |

If during any of the states, interrupt testing state 139 determines that SVOINT is asserted, microprocessor 22 requests to access buffer memory 40 are granted the highest priority by buffer manager 38, thereby enabling microprocessor 22 to clear all its pending instruction and data fetches. DISK 140, ECC 142, HOST 146, and REF/DFMAP 150 service states are terminated gracefully along paths C when SVOINT is asserted, and control is passed a group of special microprocessor and host service states SVOCPUS 152, SVOCPUB 154, and SVOHOST 156. If one of the microprocessor channels CPUB 144 or CPUS 148 is currently being serviced, at the completion of that service, control passes to the special service states. The preferred number of accesses for the special service states are shown below in Table 2.

TABLE 2

| SPECIAL SERVICE STATE | NO. OF MEMORY ACCESSES |
| --- | --- |
| SVOCPUS | up to 2 |
| SVOCPUB | up to programmed value |
| SVOHOST | 1 |

SVOINT is preferably asserted for a maximum time required for all microprocessor 22 access requests to clear from its execution pipeline. These special service states are entered only if SVOINT is asserted, and if it is, the associated channels are serviced until SVOINT is deasserted. The SVOHOST state channel is serviced a word at a time, which keeps buffer manager 38 busy between microprocessor 22 read instructions without completely disabling host data channel servicing.

Worst case timing for microprocessor 22 to clear its execution pipeline exists when one 32-bit write instruction is pending and three 32-bit read instructions are pending. In between the microprocessor 22 accesses, the host channel is allowed time for three single-word accesses. In the preferred embodiment, a microprocessor write instruction takes 135 nanoseconds ("nsec"), and a microprocessor read instruction takes 300 nsec. The host channel that is serviced a word at a time requires 120 nsec. Therefore the worst case instruction pipeline clearing time is 1,395 nsec.

In the preferred embodiment, SVOINT may be asserted at any time within the duration of spoke gate 100, or for up to about 6,000 nsec. Disk writing instructions have the entire duration of spoke gate 100 to fill FIFO 36, and reading instructions require only about 2,300 nsec to empty FIFO 36. Even if other channels cannot be serviced for 1,500 nsec, there is ample time during spoke gate 100 to service all requests. Of course, the host channel can be throttled for this short time interval.

In light of the above timing considerations, SVOINT is preferably asserted according to the following guidelines. SVOINT is not asserted until at least 750 nsec into spoke gate 100, is not asserted after the end of spoke gate 100, and is preferably deasserted at least 250 nsec before the end of spoke gate 100. SVOINT is preferably asserted for less than 1,500 nsec, which is ample to cover the 1,395 nsec worst case timing requirement.

This invention is advantageous because it improves the performance of single-processor, shared buffer, disk drive 10 by reducing the uncertainty delay in starting the head servo interrupt service routine running in microprocessor 22 from prior delays of about zero to 4,500 nsec down to about zero to 1,400 nsec. The 3,100 nsec saved represents a 10 percent overhead reduction in running the 30 microsecond routine. In practice the delays have a random value within a delay range, and reducing the delay range restores otherwise lost processing time and reduces phase jitter in the servo control program, thereby improving head tracking and seeking performance.

Skilled workers will recognize that portions of this invention may be implemented differently from the implementation described above for a preferred embodiment. For example, the state diagram of FIG. 7 could be simplified if no host access was granted while the high-priority microprocessor activity was ongoing.

It will be obvious to those having skill in the art that many changes may be made to the details of the above-described embodiment of this invention without departing from the underlying principles thereof. The scope of this invention should, therefore, be determined only by the following claims.

We claim:

1. An apparatus for arbitrating requests for access to a single buffer memory embedded within a disk drive including a disk storing data regions and servo regions, the requests presented by client channels including a disk data channel, a host interface data channel, and a microprocessor channel, the servo regions providing disk drive head servo information for a head positioning program executed by a microprocessor, the apparatus comprising:

a buffer manager arranging the disk data channel, the host interface data channel, and the microprocessor channel into a round-robin circular priority queue, assigning the disk data channel a highest priority for buffer access requests in the queue, and conducting an arbitration cycle by progressively servicing buffer access requests pending within the queue, beginning with providing buffer access to the disk data channel;

a data transducer head sensing a disk servo region;

a head position servo coupled to the data transducer head asserting a servo interrupt signal to at least one of the buffer manager and the microprocessor in response to the sensing of the servo region; and the buffer manager assigning the highest priority to servicing the microprocessor channel buffer access requests while the servo interrupt signal is asserted, thereby rapidly clearing the microprocessor channel access requests and expediting execution of the head positioning program.

2. The apparatus of claim 1 in which the client channels further include at least one of an error correction channel, a buffer memory refresh channel, and a defect map fetch channel.

3. The apparatus of claim 1 in which the servo regions each include a servo address mark that is used by the head position servo as a reference point for asserting the servo interrupt signal.

4. The apparatus of claim 3 in which the head position servo includes a sector timer that accumulates a time duration between the servo address marks, each servo address mark resetting the sector timer and initiating the servo interrupt signal.

5. The apparatus of claim 4 in which the servo interrupt signal is asserted until the sector timer accumulates a predetermined time value.

6. A method for arbitrating requests for access to a single buffer memory embedded within a disk drive, the requests presented by client channels including a disk data channel, a host interface data channel, and a microprocessor channel, wherein servo regions on a disk in the disk drive provide disk drive head servo information for a head positioning program executed by the microprocessor, the method comprising:

arranging the disk data channel, the host interface data channel, and the microprocessor channel into a round-robin circular priority queue;

assigning the disk data channel a highest priority for buffer access requests in the queue;

conducting an arbitration cycle by sequentially servicing buffer access requests pending within the queue, beginning with providing buffer access to the disk data channel;

sensing a disk servo region;

asserting an interrupt signal in response to sensing the disk servo region;

assigning the microprocessor channel the highest priority for buffer access requests while the interrupt signal is asserted, thereby rapidly clearing the microprocessor channel access requests; and executing the head positioning program.

7. The method of claim 6 further including repeating the assigning the disk drive channel through executing steps in response to sensing a disk data region.

8. The method of claim 6 further including entering an idle state if during an arbitration cycle completion interval there are no pending buffer memory access requests from any client channel.

9. The method of claim 6 in which the client channels further include at least one of an error correction channel, a buffer memory refresh channel, and a defect map fetch channel.

10. The method of claim 6 in which the servo regions include a servo address mark that is used as a reference point for asserting the interrupt signal.

11. The method of claim 6 in which the interrupt signal is asserted for a programmable time duration that is a function of a number of buffer access requests that are queued in the microprocessor channel.

12. The method of claim 6 further including generating a servo interrupt signal, and in which the asserting an interrupt signal step includes synchronizing the interrupt signal with the servo interrupt signal such that the interrupt signal is asserted within a predetermined time period of generating the servo interrupt signal.

13. A method for arbitrating requests for access to a single buffer memory embedded within a disk drive, the requests presented by various client channels including a disk data channel, a host interface data channel, and a microprocessor channel, the method comprising:

asserting a servo interrupt signal responsive to encountering the beginning of a servo region;

defining a round-robin circular priority queue for servicing access requests from the client channels;

sequentially servicing buffer access requests in accordance with the round-robin circular priority queue;

while sequentially servicing the buffer access requests, monitoring the servo interrupt signal; and if and while the disk servo interrupt signal is asserted, according the microprocessor channel the highest priority for buffer access requests in order to rapidly clear any pending microprocessor channel access requests from the queue, and thereby allow servicing a predetermined servo interrupt routine with reduced delay.

14. The method of claim 13 further including deasserting the servo interrupt signal responsive to encountering the beginning of a disk data region.

15. The method of claim 13 further including entering an idle state if during an arbitration cycle completion interval there are no pending buffer memory access requests from any client channel.

16. The method of claim 13 in which the client channels further include at least one of an error correction channel, a buffer memory refresh channel, and a defect map fetch channel.

17. The method of claim 13 in which the servo region includes a servo address mark that is used as a reference point for asserting the servo interrupt signal.

18. The method of claim 13 in which the servo interrupt signal is asserted for a programmable time duration that is a function of a number of buffer access requests that are queued in the microprocessor channel.

19. The method of claim 13 further comprising:

providing a predetermined series of special service states each corresponding to a respective client channel; and wherein said according the microprocessor channel the highest priority for buffer access requests includes diverting control from the round-robin circular priority queue to the series of special service states and sequentially servicing the corresponding client channels in accordance with the special service states while the servo interrupt signal is asserted.

20. The method of claim 19 wherein the special service states include states that service the microprocessor channel and the host interface data channel subject to predetermined constraints on numbers of memory accesses.

21. The method of claim 20 wherein the host interface data channel special service state provides for servicing the host data interface channel one word at a time so as to allow host interface data channel servicing concurrently with servicing microprocessor read instructions.

22. The method of claim 19 wherein the servo interrupt signal is asserted for a selected time within the duration of a spoke gate time of the disk drive.

23. The method of claim 22 including asserting the servo interrupt signal for a selected period beginning no less than approximately 750 nsec after the beginning of the spoke gate time.

24. The method of claim 22 including deasserting the servo interrupt signal no more than approximately 250 nsec before the end of the spoke gate time.

* * * * *